(12) United States Patent
Henderson

(10) Patent No.: US 8,387,387 B1
(45) Date of Patent: Mar. 5, 2013

(54) FLOATING SOLAR POND ENERGY CONVERSION APPARATUS

(76) Inventor: Richard L. Henderson, Portland, OR (US)

(*) Notice: Subject to any disclaimer, the term of this patent is extended or adjusted under 35 U.S.C. 154(b) by 643 days.

(21) Appl. No.: 12/653,001

(22) Filed: Dec. 7, 2009

(51) Int. Cl.
*B60K 16/00* (2006.01)
*F03G 6/00* (2006.01)

(52) U.S. Cl. .................. 60/641.8; 60/641.9

(58) Field of Classification Search ............ 60/398, 60/641.1–15, 655; 126/561–568
See application file for complete search history.

(56) References Cited

U.S. PATENT DOCUMENTS

| | | | | |
|---|---|---|---|---|
| 3,490,996 | A | * | 1/1970 | Kelly, Jr. .................. 202/234 |
| 3,621,653 | A | * | 11/1971 | Pacault ........................ 60/651 |
| 3,937,599 | A | * | 2/1976 | Thureau et al. ............. 417/389 |
| 4,172,766 | A | | 10/1979 | Laing et al. |
| 4,283,913 | A | | 8/1981 | Loeb |
| 4,324,983 | A | | 4/1982 | Humiston |
| 4,350,143 | A | | 9/1982 | Laing et al. |
| 4,360,004 | A | | 11/1982 | Testolini |
| 4,373,338 | A | | 2/1983 | van der Pot |
| 4,408,459 | A | * | 10/1983 | Yogev ........................ 60/641.8 |
| 4,622,949 | A | | 11/1986 | Yahalom |
| 5,143,051 | A | * | 9/1992 | Bennett ....................... 126/561 |
| 5,404,937 | A | | 4/1995 | Assaf et al. |
| 5,513,494 | A | | 5/1996 | Flynn et al. |
| 5,755,102 | A | * | 5/1998 | Assaf et al. ................. 60/641.8 |
| 6,820,420 | B2 | | 11/2004 | Hebert |
| 2007/0289303 | A1 | | 12/2007 | Prueitt |
| 2010/0154417 | A1 | * | 6/2010 | Ferguson et al. ........... 60/641.2 |

OTHER PUBLICATIONS

U.S. Appl. No. 12/286,485, Henderson.
Website: http://www.green-trust.org/solarpond.htm (No title; Author and Publication Date unknown).

* cited by examiner

*Primary Examiner* — Thomas Denion
*Assistant Examiner* — Brian Inacay
(74) *Attorney, Agent, or Firm* — Mark A. Navarre

(57) ABSTRACT

A horizontal structure defines an expansive floating solar pond underlain by an open-ended chamber, and a distributed network of heat engines produce electricity based on the temperature differential between the heated solar pond water and ambient seawater. Each heat engine includes a heat exchanger disposed near the bottom of the solar pond, a working fluid boiler at least partially submerged in the solar pond, a turbine-generator, and a working vapor condenser disposed under the solar pond in the open-ended chamber. A heat exchange fluid is circulated through the heat exchanger and the boiler to vaporize working fluid for powering the turbine-generator, and cold ambient seawater is passed through the condenser to condense working vapor downstream of the turbine-generator. Warmed seawater from the condenser is exhausted into the open-ended chamber, where it is naturally retained by convection to minimize heat transfer from the solar pond to the ambient seawater.

8 Claims, 3 Drawing Sheets

FLOATING SOLAR POND ENERGY CONVERSION APPARATUS

FIELD OF THE INVENTION

The present invention relates to a floating solar pond energy conversion apparatus.

BACKGROUND OF THE INVENTION

A solar pond is a confined body of saline water that can collect and store solar energy by virtue of a naturally-occurring salinity gradient that inhibits convective heat mixing. The water increases in salinity, and therefore density, with increasing depth so that solar energy reaching the deepest water is effectively trapped there. This phenomenon has been observed in nature, and has been artificially reproduced in land-based ponds with dissolved salts for the purpose of generating electricity based on the heat differential between the relatively cool, low salinity, water at the surface of the pond and the hot, high salinity, water near the bottom of the pond. It has also been proposed to construct a floating solar pond in an inland body of salt water such as the Dead Sea or the Great Salt Lake where the natural salinity of the ambient water can be utilized; see, for example, the U.S. Pat. No. 4,622,949.

SUMMARY OF THE INVENTION

The present invention is directed to an improved floating solar pond and energy conversion apparatus that is optimized for electricity production in a large body of saltwater. The apparatus includes a horizontal structure at the surface of the water for forming an expansive floating solar pond underlain by an open-ended water-filled convective heat chamber, and a distributed network of heat engines for producing electricity based on the temperature differential between the confined water of the solar pond and ambient seawater at a moderate depth such as 30 m. Each heat engine includes a heat exchanger disposed near the bottom of the solar pond, a working fluid boiler at least partially submerged in the solar pond, a turbine-generator, and a working vapor condenser disposed under the solar pond in the convective heat chamber. A heat exchange fluid is circulated in closed-loop fashion through the heat exchanger and the boiler to vaporize working fluid for powering the turbine-generator, and cold ambient seawater is passed through the condenser to condense working vapor downstream of the turbine-generator. The seawater warmed by the heat-of-condensation is exhausted into the convective heat chamber, where it is naturally retained by convection to minimize heat transfer from the solar pond to the ambient seawater and to provide an ideal replacement source for solar pond water lost to evaporation.

DESCRIPTION OF THE PREFERRED EMBODIMENT

Figure 1:
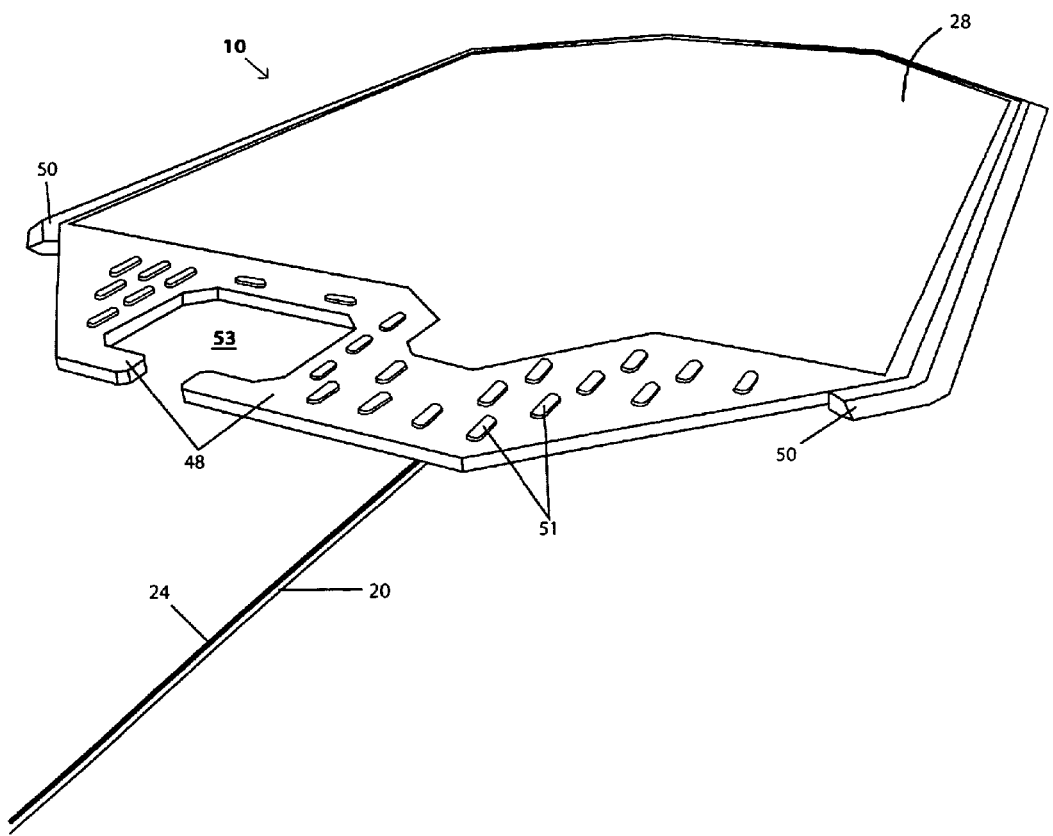
FIG. 1 is an overall isometric diagram of the floating solar pond and energy conversion apparatus of this invention as seen from above.

Referring to FIG. 1, the reference numeral 10 generally designates a floating solar pond and energy conversion apparatus according to this invention, configured for off-shore use in a body of saltwater 12. The apparatus 10 is anchored to the sea floor 14 by a distributed array of mooring cables 16. For example, the apparatus 10 may be floating in 100 m of seawater, several thousand meters from shore 18. The shore and near-shore facilities include an electricity transfer facility 20 for interfacing the apparatus 10 with a commercial electrical distribution system. Electricity produced by apparatus 10 is transferred to the electricity transfer facility 20 by a set of electrical cables 22 bundled with a seabed pipeline 24.

Figure 2:
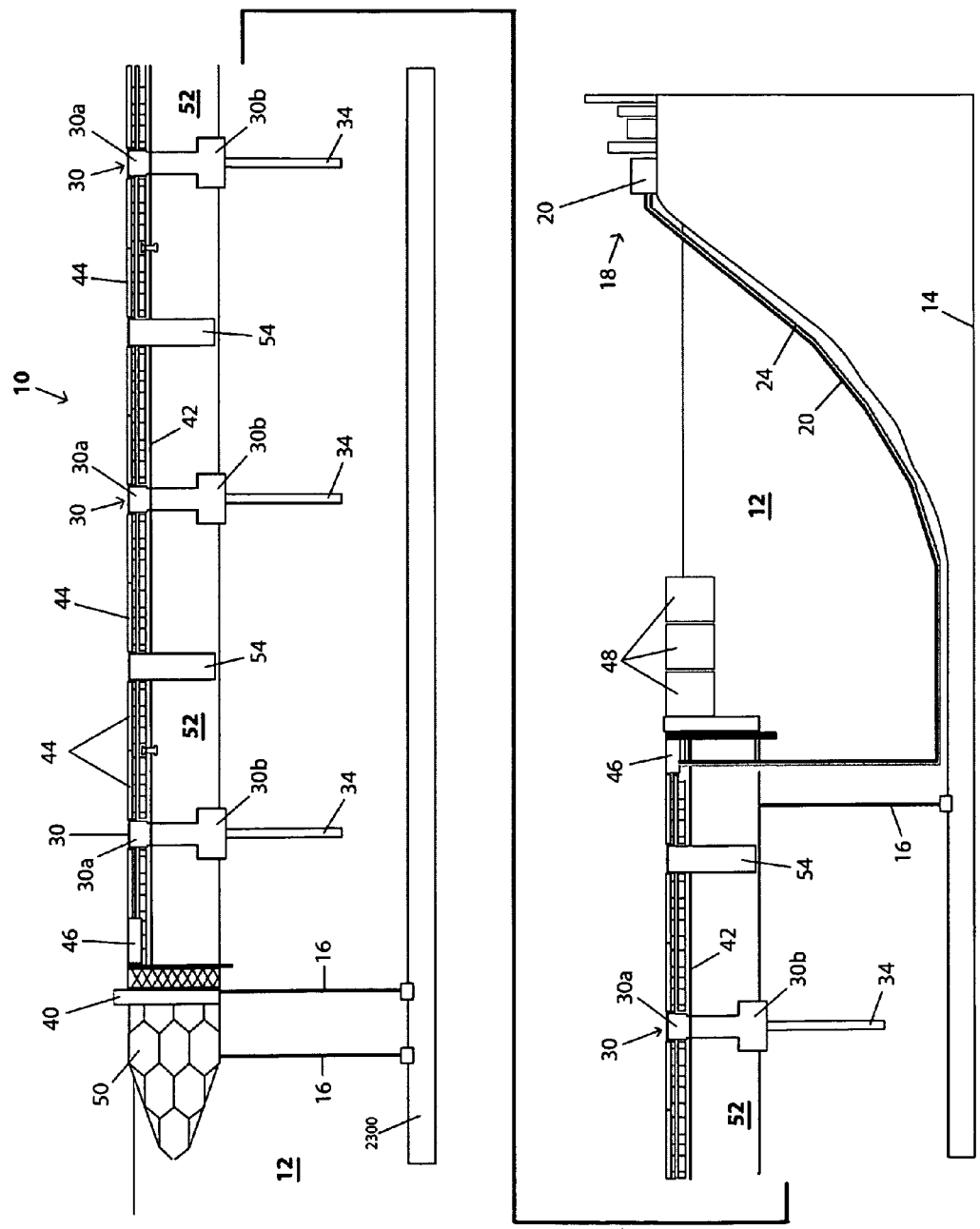
FIG. 2 is a side view of the apparatus of FIG. 1, including an energy conversion chamber, an open-ended convective heat chamber, and distributed arrays of heat engines and drain shafts.

Referring to FIG. 2, the apparatus 10 generally includes a horizontally expansive solar pond 28 and a distributed array of heat engines 30 for producing electricity utilizing the temperature differential between the confined water of the solar pond 28 and ambient seawater 12 drawn from a moderate depth (30 meters, for example) through a set of downwardly extending cold water delivery conduits 34. The solar pond 28 is bounded laterally by a peripheral seawall 40, and vertically by a horizontal barrier 42 fastened to seawall 40 at a depth of approximately 3 meters. The solar pond 28 may be open to the atmosphere, or alternately, covered with a transparent evaporation barrier 44.

The horizontal barrier 42 preferably comprises a matrix of water-impermeable irregular hexagonal plates, interlocked by peripheral double-tongue-in-groove features to form an extensive water-impermeable seal. Each such plate may comprise a core of pressure-resistant insulation that blocks conduction of infrared energy, sandwiched between upper and lower layers of water-impermeable material. Additionally, each of the plates may be fitted with a peripheral skirt of water-impermeable material that overlaps adjacent plates for enhanced plate-to-plate sealing. At the periphery of the apparatus 10, the plates interface, again by double-tongue-in groove features, with inwardly extending ledges formed on the inboard face of seawall 40.

A network of roadways 46 float on the solar pond 28, and are anchored to the peripheral seawall 40. A set of floating docks 48 are secured to a shoreward-facing portion of the peripheral seawall 40, and the remainder of seawall 40 is fitted with a sloped wave energy absorber 50 that protects the apparatus 10 from wave-related damage. Additionally, the seawall 40 may be designed to allow for drainage of seawater from very large waves that break over the seawall 40. As illustrated in FIG. 1, the docks 48 support various structures 51 (storage building and living quarters, for example), and are configured to provide a sheltered docking area 53 for vessels.

As seen in FIG. 2, the peripheral seawall 40 is mostly submerged, extending downward to a substantially greater depth than the horizontal barrier 42, creating an open-ended water-filled convective heat chamber 52 directly beneath the solar pond 28. The heat engines 30 are arranged in a generally vertical configuration; each heat engine 30 includes an upper portion 30a in the plane of the solar pond 28, a lower portion 30b disposed in the chamber 52, and the cold-water delivery conduit 34 extending down into the ambient seawater below the chamber 52. A distributed array of precipitate drain shafts 54 serve as portals to the seawater beneath apparatus 10 for disposing of surface water from rain and wave action (in configurations including the evaporation barrier 44), and accessing submersible pumps 74 coupled to the free ends of the cold-water delivery conduits 34.

Figure 3:
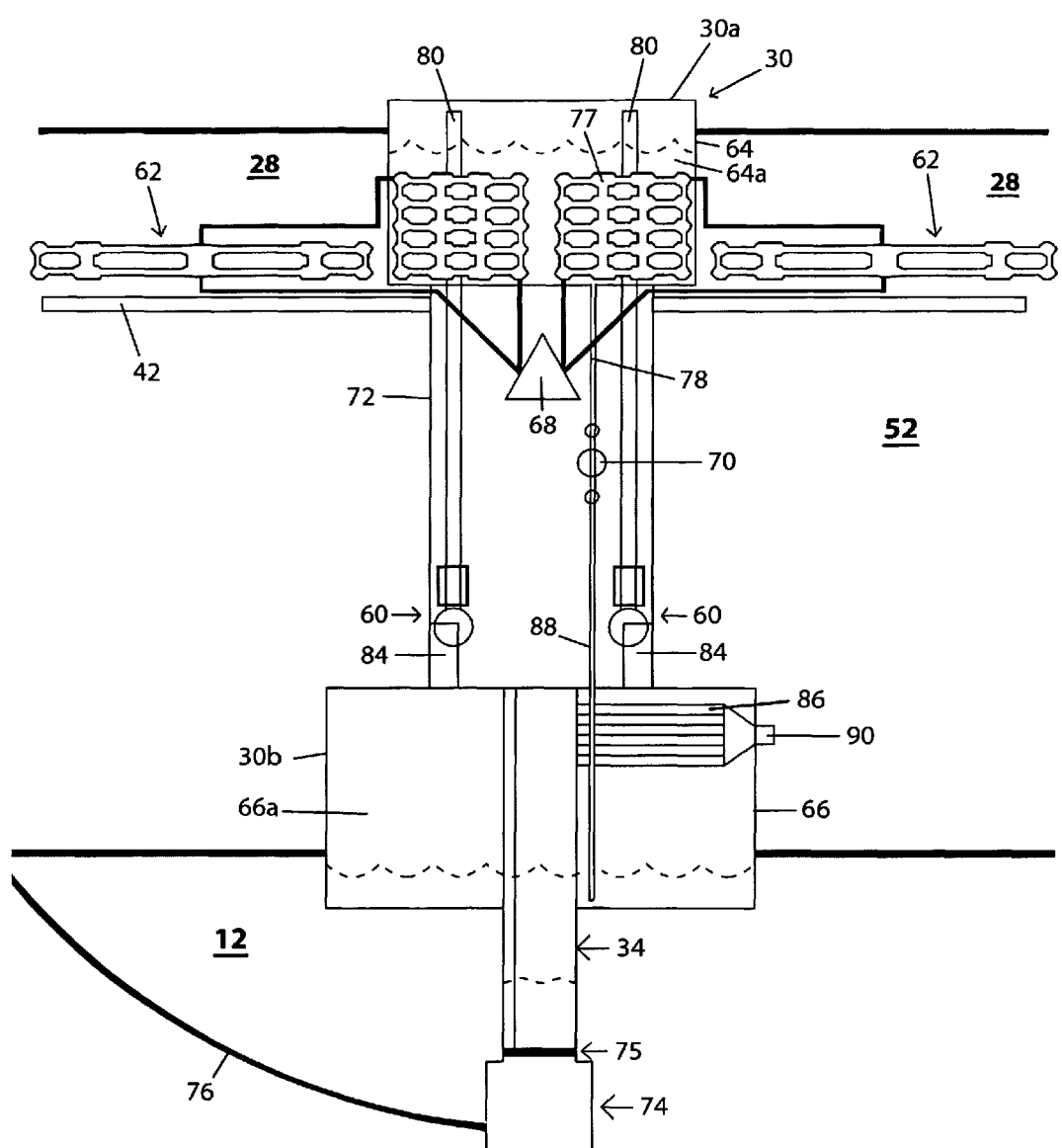
FIG. 3 is a diagram of a representative heat engine of FIG. 2.

FIG. 3 depicts a representative one of the heat engines 30 that generate electricity utilizing the temperature differential between the confined water in solar pond 28 and cold ambient seawater 12 drawn through the cold-water delivery conduit 34. In general, heat from the solar pond 28 is used to vaporize a low boiling point working fluid such as ammonia to produce vapor for driving low-pressure turbine-generators 60, and cold seawater drawn through the cold-water delivery conduit 34 is used to condense working fluid vapor downstream of the turbine-generators 60. A portion of the electricity produced by turbine-generators 60 is used within the apparatus 10 to power the various motor-driven pumps and other equipment, while the remainder is delivered to the on-shore electricity transmission station 20 via the power cables 22.

In addition to the turbine-generators 60, each heat engine 30 includes one or more heat exchangers 62 disposed in the solar pond 28 near the horizontal barrier 42, a working fluid boiler 64 at least partially submerged in the solar pond 28, and a working vapor condenser 66 disposed under the solar pond 28 in the convective heat chamber 52. The turbine-generators 60, a heat transfer fluid pump 68, and a working fluid pump 70 are disposed in an air-filled shaft 72 between boiler 64 and condenser 66. And as mentioned above, a seawater delivery pump 74 and anti-fouling device 75 are coupled to the free end of the flexible cold-water delivery conduit 34. As indicated, a tether 76 such as a cable is connected to the seawater delivery pump 74 for drawing the pump-end of flexible conduit 34 into one of the precipitate drain shafts 54 so that the pump maintenance can be conveniently performed at that location (i.e, above sea-level, on the surface of the apparatus 10).

The working fluid boiler 64 defines a sealed boiler chamber 64a, and the heat transfer fluid pump 68 continuously circulates a heat exchange (HX) fluid such as double-distilled water through the solar pond heat exchangers 62 and a network of heat transfer pipes 77 disposed in the lower portion of boiler chamber 64a. The working fluid pump 70 is periodically activated to pump liquid working fluid into the boiler chamber 64a via conduit 78, and solar energy transferred to the liquid working fluid by HX fluid in the heat transfer pipes 77 boils the working fluid. Working fluid vapor collects in the upper portion of the boiler chamber 64a, and is delivered to the turbine-generators 60 via the vapor delivery pipes 80. The working fluid downstream of the turbine-generators 60 is delivered to a condensation chamber 66a within condenser 66 via the vapor conduits 84, and the seawater delivery pump 74 forces cold seawater through a network of heat transfer pipes 86 disposed in the upper portion of condensation chamber 66a. The working fluid vapor in the upper portion of condensation chamber 66a condenses on the cold heat transfer pipes 86, and the working fluid condensate collects in the bottom of condensation chamber 66a for periodic delivery to the boiler chamber 64a via conduit 88, working fluid pump 70, and conduit 78.

The seawater pumped through the heat transfer pipes 86 in condensation chamber 66a is warmed by the heat-of-condensation and then expelled via exhaust 90 into the seawater within convective heat chamber 52 beneath the solar pond 28. The expelled seawater is considerably warmer than the surrounding seawater at that depth, and rises toward the horizontal barrier 42 by natural convection. The volume of water in chamber 52 is unchanging, of course, but the retained water is substantially warmer than the surrounding seawater at the same depth, especially in the vicinity of the horizontal barrier 42. This decreases the temperature differential across the horizontal barrier 42, and reduces heat loss from the water confined in the solar pond 28 into the ambient seawater. This same warm seawater is advantageously used to replenish solar pond water lost due to evaporation, minimizing any consequent cooling of the solar pond water.

In summary, the floating solar pond and energy conversion apparatus 10 of the present invention overcomes many of the drawbacks and limitations of the known solar pond systems. While described with respect to the illustrated embodiments, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. An energy conversion apparatus floating in seawater, comprising:
    a closed peripheral seawall having a portion that is submerged in said seawater;
    a horizontal barrier fastened to the submerged portion of said peripheral seawall at a depth of seawater that defines a first seawater chamber above said horizontal barrier and a second seawater chamber below said horizontal barrier, with both of said first and second seawater chambers being laterally bounded by said submerged portion of said peripheral seawall;
    a boiler chamber and first heat exchange system submerged in said first seawater chamber for transferring heat energy from said first seawater chamber to a liquid working fluid in said boiler chamber for vaporizing said working fluid;
    generating means for receiving vaporized working fluid from said boiler chamber to produce electricity;
    a cold-water intake pipe extending into ambient seawater below said second seawater chamber;
    a condenser chamber and second heat exchange system submerged in said second seawater chamber for receiving vaporized working fluid downstream of the generating means, and transferring heat energy from said vaporized working fluid to ambient seawater drawn from said cold-water intake pipe for condensing the vaporized working fluid; and
    a working fluid pump that returns condensed working fluid from said condenser chamber to said boiler chamber.

2. The floating solar pond and energy conversion apparatus of claim 1, where:
    said peripheral seawall includes a thermally insulative barrier; and
    said second heat exchange system includes a network of heat transfer pipes in said condenser chamber through which the ambient seawater drawn from said cold-water intake pipe is directed, and an exhaust port for expelling the seawater in said heat transfer pipes into said second seawater chamber to heat the seawater in said second seawater chamber and thereby minimize heat transfer from said solar pond to said ambient seawater.

3. The floating solar pond and energy conversion apparatus of claim 1, where said first heat exchange system further comprises:
    a heat transfer fluid;
    a first network of heat transfer pipes submerged in said first seawater chamber;
    a second network of heat transfer pipes being submerged in working fluid within said boiler chamber; and
    a heat transfer fluid pump that circulates said heat transfer fluid through said first and second networks of heat transfer pipes.

4. The floating solar pond and energy conversion apparatus of claim 3, where:

said first network of heat transfer pipes is disposed near a bottom of said first seawater chamber.

5. The floating solar pond and energy conversion apparatus of claim 3, where:
said working fluid boiler chamber, said generating means, said working vapor condenser, said working fluid pump, and said heat transfer fluid pump define a vertically arranged heat engine; and
said energy conversion apparatus includes a distributed network of said vertically arranged heat engines.

6. The floating solar pond and energy conversion apparatus of claim 3, where:
said working fluid boiler chamber, said generating means, said working vapor condenser, said working fluid pump, and said heat transfer fluid pump define a vertically arranged heat engine; and
said vertically arranged heat engine includes an air-filled shaft disposed between said working fluid boiler chamber and said working vapor condenser.

7. The floating solar pond and energy conversion apparatus of claim 6, where:
said generating means, said working fluid pump, and said heat transfer fluid pump are disposed in said air-filled shaft.

8. The floating solar pond and energy conversion apparatus of claim 1, further comprising:
a transparent evaporation barrier covering an upper surface of said first seawater chamber.

* * * * *